US007542487B2

(12) United States Patent
Gatto et al.

(10) Patent No.: US 7,542,487 B2
(45) Date of Patent: Jun. 2, 2009

(54) METHODS AND SYSTEMS FOR LARGE SCALE CONTROLLED AND SECURE DATA DOWNLOADING (75) Inventors: Jean-Marie Gatto, London (GB); Thierry Brunet De Courssou, London (GB)

(73) Assignee: Mudalla Technology, Inc., Henderson, NV (US)

( * ) Notice: Subject to any disclaimer, the term of this patent is extended or adjusted under 35 U.S.C. 154(b) by 650 days.

(21) Appl. No.: 10/493,651

(22) PCT Filed: Nov. 22, 2002

(86) PCT No.: PCT/US02/37529

§ 371 (c)(1),
(2), (4) Date: Apr. 23, 2004

(87) PCT Pub. No.: WO03/047211

PCT Pub. Date: Jun. 5, 2003

(65) Prior Publication Data
US 2004/0193726 A1  Sep. 30, 2004

(51) Int. Cl.
*G01R 31/08* (2006.01)
*H04J 3/24* (2006.01)
*H04J 3/06* (2006.01)
*G06F 15/16* (2006.01)
*G06F 15/173* (2006.01)

(52) U.S. Cl. .................. 370/519; 370/230; 370/473; 370/278; 709/203; 709/225; 709/232

(58) Field of Classification Search .............. 709/224, 709/219, 225, 232, 203, 208, 217; 370/229, 370/230, 230.1, 232, 235, 390, 509, 512, 370/519

See application file for complete search history.

(56) References Cited

U.S. PATENT DOCUMENTS

| 4,372,558 | A | * | 2/1983 | Shimamoto et al. ........... 463/41 |
| 4,412,326 | A | * | 10/1983 | Limb ........................ 370/448 |
| 4,825,354 | A | * | 4/1989 | Agrawal et al. .............. 707/10 |
| 5,065,398 | A |   | 11/1991 | Takashima |
| 5,327,581 | A |   | 7/1994 | Goldberg |
| 5,485,147 | A | * | 1/1996 | Jaffe et al. ................. 370/445 |
| 5,548,646 | A | * | 8/1996 | Aziz et al. .................. 713/153 |
| 5,663,951 | A | * | 9/1997 | Danneels et al. ............ 370/230 |
| 5,671,225 | A | * | 9/1997 | Hooper et al. .............. 370/468 |
| 5,689,553 | A | * | 11/1997 | Ahuja et al. ............ 379/202.01 |
| 5,706,281 | A |   | 1/1998 | Hashimoto et al. |

(Continued)

FOREIGN PATENT DOCUMENTS

EP    0 789 471 A2    8/1997

*Primary Examiner*—Hanh Nguyen
(74) *Attorney, Agent, or Firm*—Young Law Firm, P.C.

(57) ABSTRACT

A method to manage the secure download of data (102) to a very large number of network connected client devices (104, 110, 112, 114, 116, 118, 1120, 122) distributed within large geographic areas. The method provides adaptive data throttling and makes optimal use of network data bandwidth. The method can be advantageously applied for managing simultaneous data downloading to millions of network connected remote devices (104, 110, 112, 114, 116, 118, 1120, 122) via private networks, public networks and the Internet (124). A close-loop download regulation algorithm achieves the highest download capacity for the files without exceeding the maximum network capacity and without degrading the transactional and operational traffic performance between the server and the connected client devices.

38 Claims, 9 Drawing Sheets

U.S. PATENT DOCUMENTS

| | | | |
|---|---|---|---|
| 5,818,828 A * | 10/1998 | Packer et al. | 370/346 |
| 5,935,218 A * | 8/1999 | Beyda et al. | 709/251 |
| 6,749,510 B2 | 6/2004 | Giobbi | |
| 6,859,910 B2 * | 2/2005 | Croy | 715/513 |
| 2001/0005371 A1 | 6/2001 | Sera | |
| 2002/0118806 A1 | 8/2002 | Walker et al. | |

* cited by examiner

Master Schedule Table

| | Device ID# (902) | Data File (904) | Packet # (906) | Delay (908) |
|---|---|---|---|---|
| GROUP 1 | 1 | ABC.CAB | 192 of 747 | 250 |
| | 2 | ABC.CAB | 190 of 747 | 250 |
| | 3 | ABC.CAB | 193 of 747 | 250 |
| | 4 | ABC.CAB | 191 of 747 | 250 |
| | 5 | ABC.CAB | 190 of 747 | 250 |
| | 6 | ABC.CAB | 189 of 747 | 250 |

Etc.

| | | | | |
|---|---|---|---|---|
| GROUP 2 | 12000 | ABC.CAB | 251 of 747 | 500 |
| | 12001 | ABC.CAB | 255 of 747 | 500 |
| | 12002 | ABC.CAB | 250 of 747 | 500 |
| | 12003 | ABC.CAB | 252 of 747 | 500 |
| | 12004 | ABC.CAB | 253 of 747 | 500 |
| | 12005 | ABC.CAB | 251 of 747 | 500 |

Etc.

| | | | | |
|---|---|---|---|---|
| GROUP 3 | 5273652 | ABC.CAB | 175 of 747 | 100 |
| | 5273653 | ABC.CAB | 176 of 747 | 100 |
| | 5273654 | ABC.CAB | 179 of 747 | 100 |
| | 5273655 | ABC.CAB | 176 of 747 | 100 |
| | 5273656 | ABC.CAB | 173 of 747 | 100 |
| | 5273657 | ABC.CAB | 174 of 747 | 100 |

Etc.

METHODS AND SYSTEMS FOR LARGE SCALE CONTROLLED AND SECURE DATA DOWNLOADING

BACKGROUND OF THE INVENTION

1. Field of the Invention

The invention generally pertains to the field of remotely located network connected intelligent devices.

2. Description of the Related Art

In legacy bandwidth-limited distributed networks prior to the Internet era, to update the code of a large numbers of (lottery, for example) terminals, a download server typically "pushed" the data to each terminal. Under such a scheme, scheduling and error recovery are carried out entirely under the control of the download server.

However, new generation lottery terminals, gaming machines and Point-of-Sale (POS) terminals based on PC architecture or other multimedia-enabled architecture may require frequent and voluminous updates and downloads of programs and data in order to provide continuously updated rich services. In such systems, downloading is commonly carried out using a traditional "pull" method in which each remote machine is scheduled to initiate a download at a predetermined time from a predetermined remotely located server. At the scheduled time, the entire transfer is carried out under the control of the remote terminal, including error recovery. Well-known and popular downloading utilities include programs such as GetRight (www.getright.com) and Gozilla (www.gozilla.com). Using such programs, however, the server that delivers the data file to be downloaded by the remote terminal devices is usually a generic FTP server that does not have capability of intelligently managing the network traffic.

Geographically distributed download cache technologies, such as available from Akamai (www.akamai.com) and Digital Island "2Deliver" service (www.digitalisland.com) accelerate Internet network performance when downloading static data from global Internet servers. For example, Amakai has deployed on the order of 10,000 servers around the world.

There is a significant risk for the network that links the remote terminal devices and the central system to be subjected to unauthorized intrusion, virus infection and distributed denial of service (DDOS); consequently costly bandwidth limited private networks are often preferred. Alternatively, Virtual Private Networks (VPN) to carry secure communication through an encrypted tunnel via the Internet is becoming increasingly popular for company inter-communications. However, the setup and infrastructure management costs are high, as is the cost of training software developers. Moreover, the scalability of VPNs to very a large number of client devices has not been demonstrated at this time.

Uncontrolled data downloads may render the operational network traffic useless, with the same consequences as Distributed Denial Of Service attacks (DDOS); therefore, data downloading is conventionally scheduled outside of operational hours. The requirement to perform data downloads outside operational hours results in significant waste of data bandwidth resources and longer download campaigns.

In addition, with the traditional "pull" download method, there is no feed-back that would enable performing a close-loop regulation of the individual terminal device download rates in order to ensure a uniform or predetermined download level. Although the "push" method allows fine-grained download bandwidth throttling, error recovery management requires a very complex download server that cannot easily scale to a very large number of client devices. Legacy distributed network also make use of broadcast download techniques, but error recovery is complex and the Internet infrastructure cannot readily support such broadcast download techniques.

Figure 1:
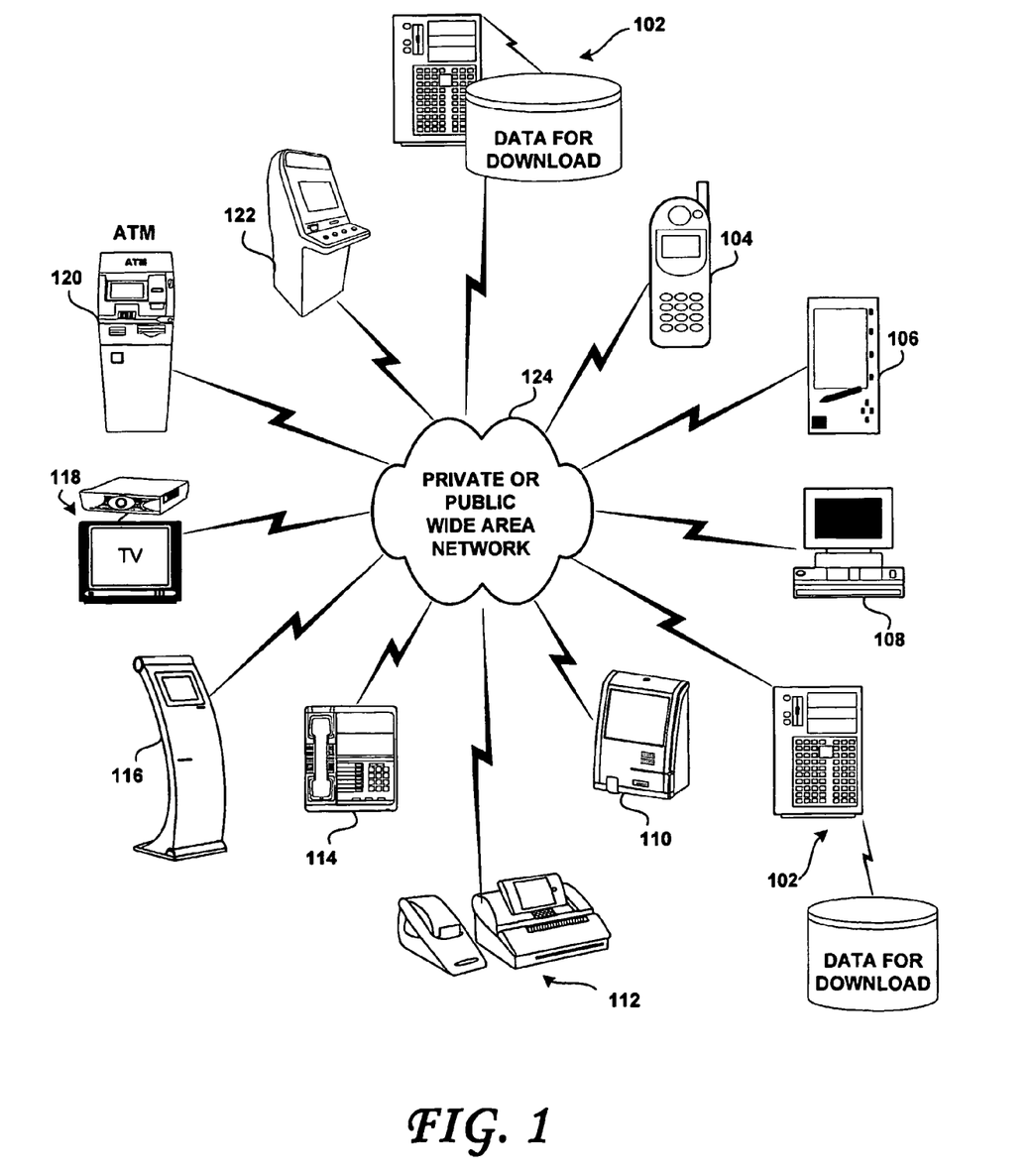
FIG. 1 is a diagram depicting a number of network-connected computing devices.
Figure 6:
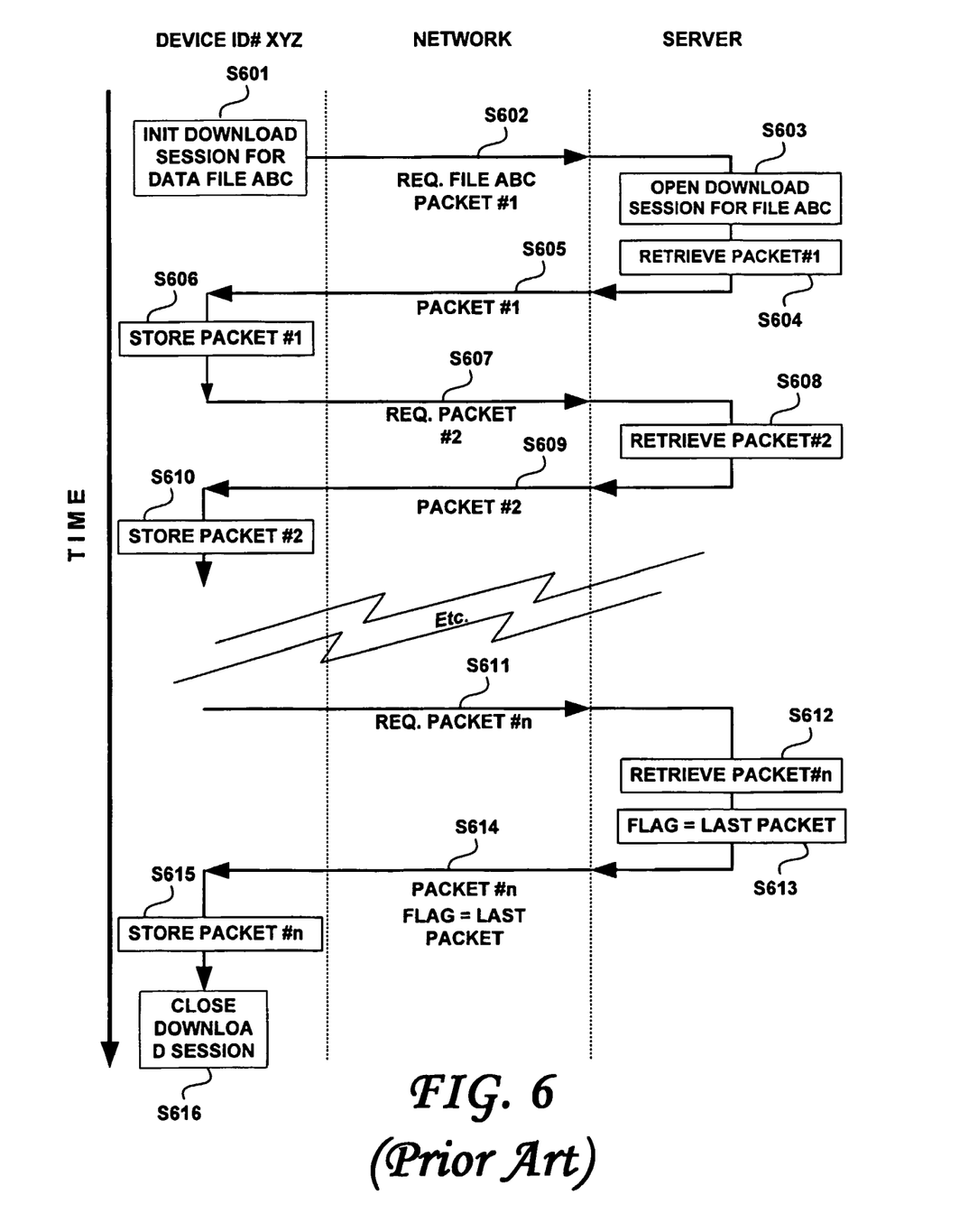
FIG. 6 is a flowchart illustrating a conventional unregulated download session.

FIG. 6 is a flowchart illustrating a conventional unregulated download session. In FIG. 6, the boundaries between the remote device (such as devices 104-122, for example), the network 124 and the transactional server 102 of FIG. 1 are shown in dashed lines. According to the conventional method of FIG. 6, a device whose identifier (ID) is XYZ initiates a download session to retrieve data file ABC from a server 102, at step S601. The download session then requests the first packet of file ABC, as shown at S602. The server 102 receives this request, opens a download session for file ABC at S603, retrieves packet #1 and sends the retrieved packet #1 to the requesting remote device at S605. The remote device receives packet #1 from the server and stores it, as shown at S606. Packet #2 is then requested, retrieved and sent back to and stored by the remote device, as shown at S607, S608, S609 and S610. The remote device then continues in a similar manner, until Packet n is requested at S611 and retrieved at S612. As the transactional determines that Packet n is the last packet of file ABC, the server 102 sets a last packet flag at S613 and sends the last Packet n together with the last packet flag at S614. The remote device then receives this last Packet and stores it, as shown at S615. Upon receipt of the last packet flag together with the last Packet n, the remote device closes the download session, as shown at S616. Upon confirmation of the good receipt of file ABC by the remote device, the server 102 may then close the download session opened in step S603.

As shown in FIG. 6, the remote device initiates the download session, which session is ended by the remote device when the last data packet is received. The remote device, therefore, is called the session master. Details of error recovery are not shown in FIG. 6. However, it will be apparent to those of skill that the remote device may request the transmission or re-transmission of any packet. The flow of data in FIG. 6 is un-regulated and download speed is inherently limited by the capacity and congestion of the network 124. Each remote device "fights" to get its own data immediately. When considering a very large number of download sessions using the same unregulated scheme, data traffic can be drawn down to a crawl, thereby denying high priority traffic and resulting in the dreaded DDOS (Distributed-Denial-Of-Service). Although QOS (Quality-Of-Service) mechanisms are available in order to route traffic according to priority attributes, such mechanisms are not universally implemented in routers across all wide area networks. Consequently, prioritization of traffic using QOS or other similar scheme by routers does not regulate data traffic in a satisfactory manner.

SUMMARY OF THE INVENTION

In accordance with the above-described objects and those that will be mentioned and will become apparent below, a method for a server to send a file to a remote device over a network without exceeding a maximum capacity of the network and without degrading transactional and operational traffic performance between the server and the remote device, according to an embodiment of the present invention, may include dividing the file into a plurality of packets; a first sending step to send a packet of the plurality of packets to the remote device along with a selected delay value, the selected delay value specifying a period of time that the remote device must wait before requesting another packet of the plurality of packets from the server, the delay value being selected as a function of at least the capacity of the network and an observed transactional and operational traffic between the server and the remote device; receiving, after a period of time at least equal to the delay value, a request for another packet of the plurality of packets from the remote device; returning to the first sending step until a request for a last packet of the plurality of packets may be received from the remote device, and a second sending step to send the last packet of the plurality of packets to the remote device.

The selected delay value may be maintained constant during the first and second sending steps. Alternatively, the selected delay value may be dynamic, and the server further may carry out a step of varying the selected delay value. The selected delay value may be stored in a master schedule table and the first sending step may include a step of selecting the delay value from the master schedule table. The server may be adapted to change the selected delay value to change the rate at which the plurality of packets are sent to the remote device. A step of increasing or decreasing the delay value sent to the remote device may be carried out as a function of the maximum capacity of a communication channel between the server and the remote device, an observed operational traffic between the remote device and the server and/or the rate at which the server is sending successive packets of the plurality of packets to the remote device. The method further may include a step of receiving a request for the file from the remote device. The request may include an identification of the file and a device ID unique to the remote device. The method may further include a step of retrieving the delay value from a master schedule table stored by the server, the delay value sent during the first sending step being associated in the master schedule table with the device ID received from the remote device. A step of tracking a progress of the first and second steps may be carried out by storing an identification of a latest packet sent to the remote device in the master schedule table. The method may further include establishing a transactional tunnel between the server and the remote device and the first and second sending steps may send the plurality of packets through the transactional tunnel. The file may be at least a portion of a game and the plurality of remote devices may include a gaming machine. The file may include multimedia content and the plurality of remote devices may include a multimedia kiosk. The file may include multimedia content and the plurality of remote devices may include a set top box for a television, for example. The delay value may be selected by evaluating a close-loop download regulation algorithm configured to achieve a highest download capacity for the file without exceeding the maximum network capacity and without degrading the transactional and operational traffic performance between the server and the remote device. The method may further include a step of grouping the plurality of remote devices into a plurality of groups and the selected delay value may be selectable for each group. The delay may be selected to be as short as possible without exceeding the maximum network capacity and without degrading the transactional and operational traffic performance between the server and the remote device.

According to another embodiment thereof, the present invention is a method for a server to send a file to a plurality of remote devices over a network without exceeding a maximum capacity of the network and without degrading transactional and operational traffic performance between the server and the remote devices, comprising dividing the file into a plurality of packets; sending constituent packets of the plurality of packets to each of the plurality of remote devices at a rate that is controlled by a selected delay value that is configurable for each of the plurality of packets and for each of the plurality of remote devices, the selected delay being effective to cause the server and/or the plurality of remote devices to wait for an expiry of the selected delay value before sending and requesting, respectively, a next packet of the plurality of packets, the delay value being selected as a function of at least the capacity of the network and the observed transactional and operational traffic between the server and the remote devices.

The selected delay value for each of the plurality of remote devices may be stored in a master schedule table and the sending step may include a step of selecting the delay value from the master schedule table. The method may further include the step of increasing or decreasing the selected delay value as a function of the maximum capacity of the communication channel between the server and the remote devices, the observed operational traffic between the remote devices and the server and/or the rate at which the server is sending successive packets of the plurality of packets to the remote devices. The method may further include a step of the server receiving a request for the file from each of the plurality of remote device, the requests including an identification of the file and a device ID associated with and unique to the requesting remote device. The method may further include a step of retrieving the delay value from a master schedule table stored by the server, the selected delay value being associated in the master schedule table with the received device ID. The method may further include the step of tracking a progress of the sending step by storing an identification of the latest packet sent to each of the plurality of remote devices in the master schedule table. A step of changing the selected delay value associated with selected ones of the plurality of remote devices based upon the identification of the latest packet sent to the selected ones of the plurality of remote devices may also be carried out. The method may further include a step of grouping the plurality of remote devices into a plurality of groups and the rate at which the constituent packets of the plurality of packets are sent to the remote devices may be selectable for each group. The method may further include a step of the server initiating the sending of the file to the plurality of remote devices, the initiating server requesting a device ID from each of the plurality of remote devices. The method further may include a step of retrieving the delay value from a master schedule table stored by the server, the selected delay value for each of the plurality of remote devices being associated in the master schedule table with the requested device ID received from each of the plurality of remote devices. A step of establishing a transactional tunnel between the server and each of the plurality of remote devices may also be carried out, the sending step sending the plurality of packets through the transactional tunnel. For example, the file may be at least a portion of a game and the plurality of remote devices may include a gaming machine. Alternatively, the file may include multimedia content and the plurality of remote devices may include a multimedia kiosk, for example. Alternatively still, the file may include multimedia content and the plurality of remote devices may include a set top box for a television. The delay value may be selected by evaluating a close-loop download regulation algorithm configured to achieve the highest download capacity for the file without exceeding the maximum network capacity and without degrading the transactional and operational traffic performance between the server and the remote device. The delay may be selected to be as short as possible without exceeding the maximum network capacity and without degrading the transactional and operational traffic performance between the server and the remote device.

According to still another embodiment of the present invention, a method for controlling a download of a file on a network from a server to a plurality of remote devices simultaneously with a higher priority operational traffic, may include observing (e.g., measuring, determining) the operational traffic and determining an available bandwidth on the network as a function at least of the observed operational traffic; computing a delay value for each of or for a selection of the plurality of remote devices as a function at least of the determined available bandwidth, and sending a predetermined number of file fragments of the file to the plurality of remote devices at a rate that is controlled by the computed delay value.

The sending step may include a step of the server waiting for an expiry of the computed delay value before sending a next file fragment of the predetermined number of file fragments to each of or to the selection of the plurality of remote devices. The method may further include a step of recording the computed delay values in a master schedule. The method may also include retrieving the recorded delay values from the master schedule prior to the sending step. The sending step may include a step of encrypting and/or signing (or otherwise securing) the predetermined number of file fragments.

According to still another embodiment, a method for controlling the download of a file on a network from a server to a plurality of remote devices simultaneously with a higher priority operational traffic, includes observing the operational traffic and determining an available bandwidth on the network as a function at least of the observed operational traffic; computing a delay value for each of or for a selection of the plurality of remote devices as a function at least of the determined available bandwidth, and causing the plurality of remote devices to each receive a predetermined number of file fragments of the file at a rate that may be controlled by the computed delay value.

The sending step may include a step of the server waiting for an expiry of the computed delay value before sending a next file fragment of the predetermined number of file fragments to each of or to the selection of the plurality of remote devices. The method may further include a step of recording the computed delay values in a master schedule. The method may further include retrieving the recorded delay values from the master schedule prior to the sending step. The sending step may include a step of encrypting and/or signing (or otherwise securing) the predetermined number of file fragments.

BRIEF DESCRIPTION OF THE DRAWINGS

For a further understanding of the objects and advantages of the present invention, reference should be made to the following detailed description, taken in conjunction with the accompanying figures, in which.

DETAILED DESCRIPTION OF THE INVENTION

The methods described herein have none of the inconvenient of the prior art. The present invention efficiently manages the secure download of data to very large numbers of network-connected client devices distributed across large geographic areas. In so doing, the present methods provide close-loop data throttling and make optimal use of available network data bandwidth. Advantageously, the present methods may be deployed to efficiently manage the downloading requirements to millions of network-connected remote devices via private networks, public networks and/or the Internet. In addition, the present methods may be advantageously deployed to manage the downloading of very large data files such as required by latest generation gaming machines for adding new games, updating video clips or upgrading entire operating systems, for example.

Tunneling refers to point-to-point networking using a given protocol. In particular, VPN is widely used for point-to-point encryption and relies on two standard tunneling techniques PPTP (Point-To-Point Tunneling Protocol) and L2TP (Layer 2 Tunneling Protocol). Other tunneling techniques are also defined to secure wireless traffic.

The present invention complements the transactional methods described in commonly assigned and co-pending applications Ser. No. 09/862,165 entitled "Trusted Transactional Set-Top Box" filed on May 21, 2001, Ser. No. 09/862,036 entitled "Trusted Transactional Internet Kiosk" filed on May 21, 200, Ser. No. 09/861,850 entitled "Trusted Transactional Controller" filed on May 21, 2001 and Ser. No. 09/565,579 entitled "Fast Web Interface Server, Network Architectures And Systems Using Same", the disclosure of each being incorporated herein in its entirety. The applicability of the present invention is not limited to the above-enumerated invention, but may be extended to permit secure data downloads to most any devices.

The present systems and methods may advantageously utilize a transactional tunnel established between a download server and a terminal device using the transactional method described in the filed applications listed above. Moreover, the present invention may also be advantageously applied to an Internet VPN. The present invention is scalable in order to permit the data download to millions of remotely located smart devices such as lottery terminals, game machines, kiosks, handheld mobile devices and set top boxes.

According to the present invention, in order to perform data download, the remote device establishes a download session through a transactional tunnel that feature extremely robust data integrity and error recovery mechanisms even when using unreliable wireless communication. Subsequently, data is automatically downloaded until completion.

Figure 2:
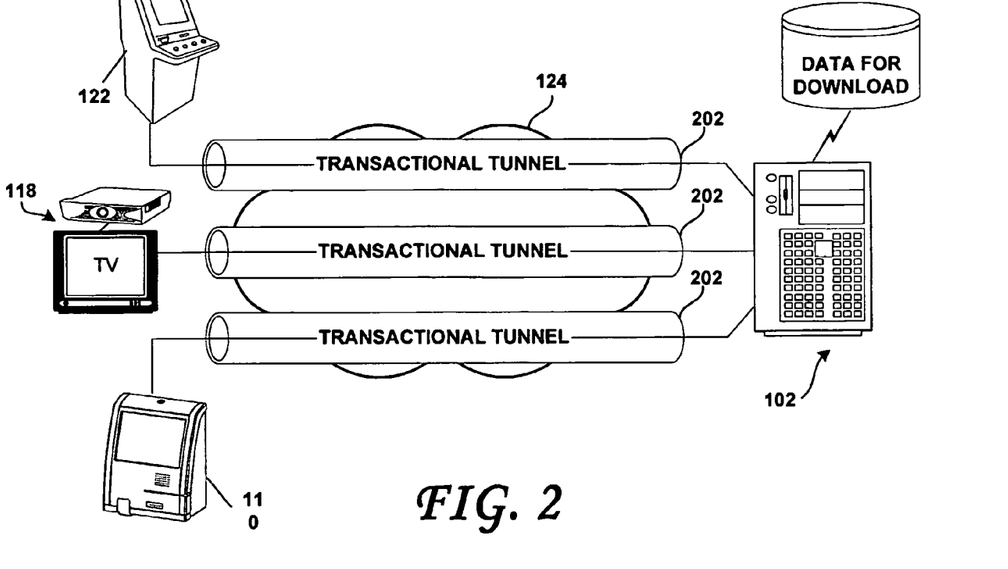
FIG. 2 is a diagram depicting transactional tunnels through a network.

As shown in FIG. 2, the present download method may use transactional tunnels 202 through the network 124. The tunnels 202 are established between the central transaction server 102 and each of the remote devices, examples of which are shown in FIG. 2 at 112, 118 and 110. A transactional tunnel is a transactional session that encapsulates transactional traffic.

Figure 3:
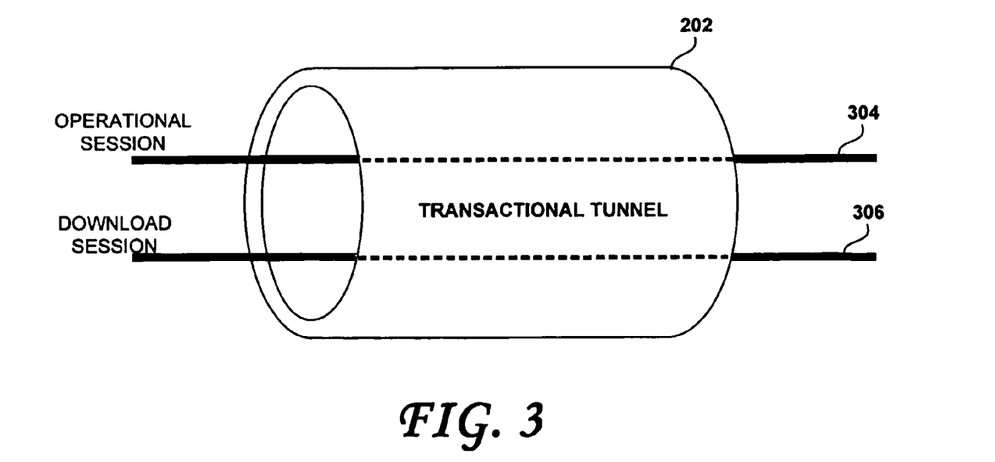
FIG. 3 is a diagram depicting operational and download traffic passing through a transactional tunnel.

FIG. 3 shows operational traffic 304 and download traffic 306 passing through a transactional tunnel 202. In addition, each transactional tunnel 202 may allow traffic for operational traffic 304 and for data download traffic 306. The operational traffic 304 is entirely controlled under an operational session. The data download traffic 306 is entirely controlled under a download session. The operational traffic 304 is used for the real-time processing of transactions, which are allocated the highest priority in order to guarantee performance, while the download traffic 306 is allocated a lower priority.

Figure 4:
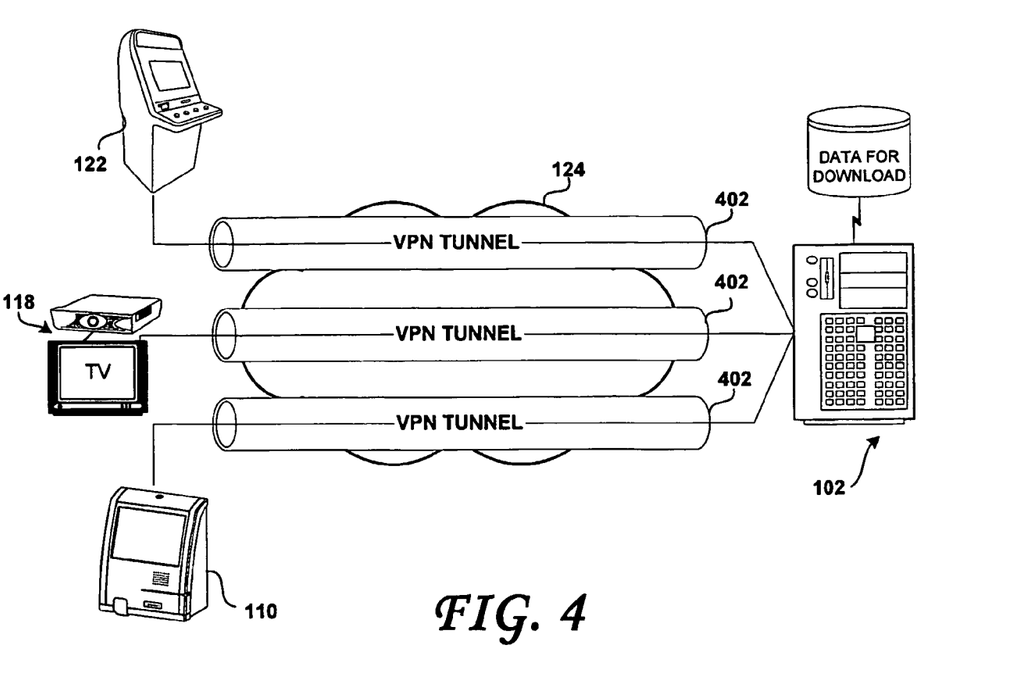
FIG. 4 is a diagram depicting Virtual Private Network (VPN) tunnels.

FIG. 4 illustrates the use of VPN tunnels. In order to make use of public networks such as the Internet, VPNs may also be used to securely carry the transactional traffic. VPN tunnels are established between the central transaction server 102 and each of the remote devices, such as the remote devices 122, 118 and 110 shown.

Figure 5:
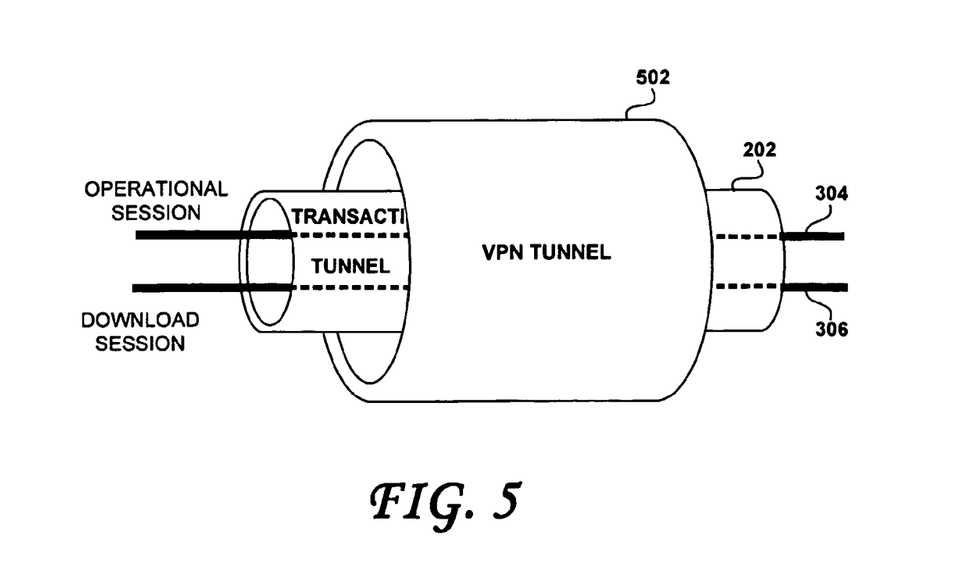
FIG. 5 is a diagram depicting a transactional tunnel through a VPN tunnel.

FIG. 5 shows the use of a transactional tunnel 202 passing through a VPN tunnel 502. In this manner, each VPN tunnel 502 carries the transactional tunnel 202 associated with the link between the central transactional server 102 and a given remote device.

The use of VPNs to carry secure communication through an encrypted tunnel via the Internet is becoming increasingly popular for intra and inter-company communications. However, the setup costs and the costs associated with managing the infrastructure and training the software developers are high. Moreover, VPN scalability to a very large number of client devices is not proven at this time.

Figure 7:
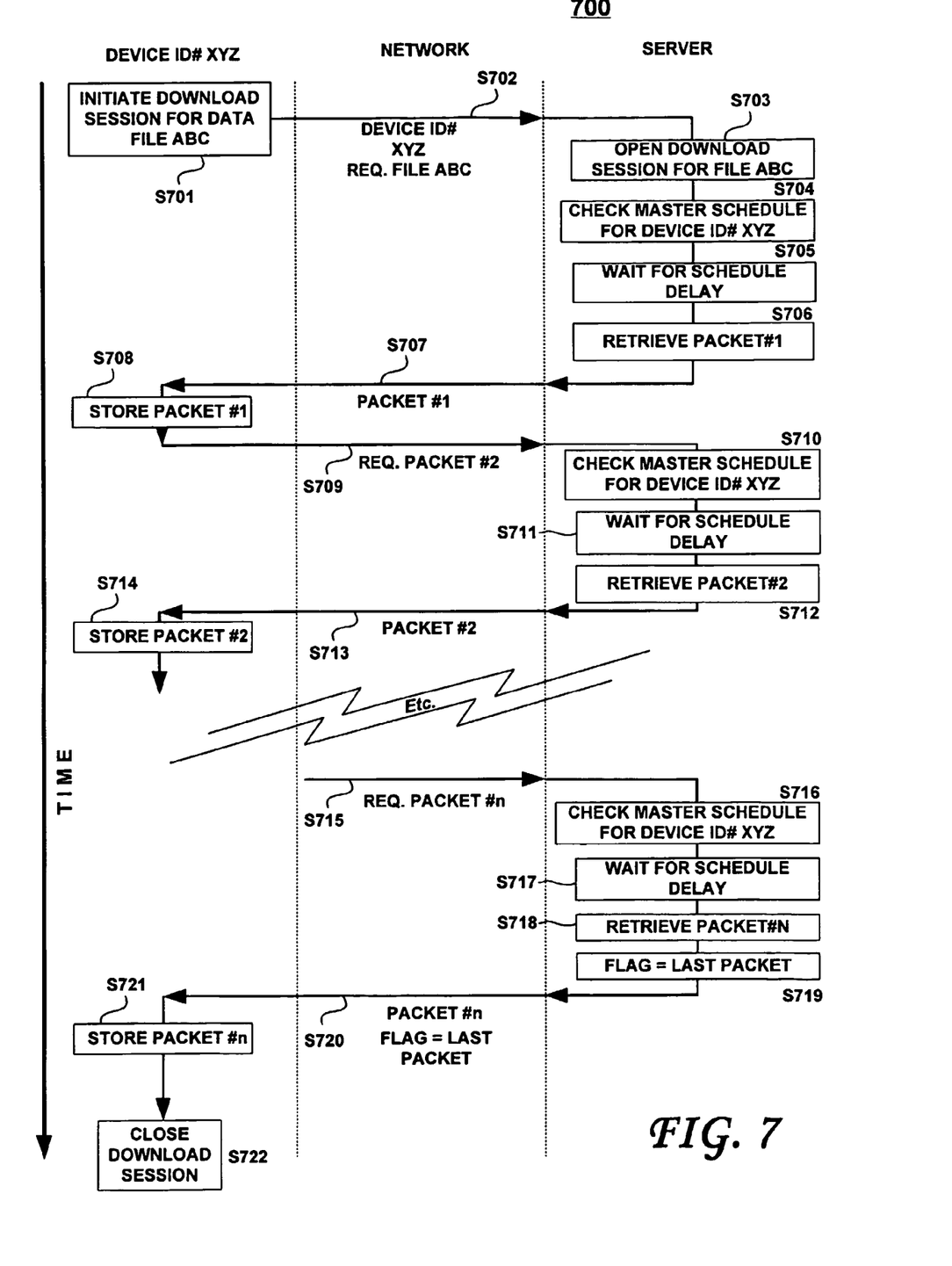
FIG. 7 is a flowchart illustrating a regulated download session, according to an embodiment of the present invention.

FIG. 7 is a flowchart illustrating a regulated download session 700, according to an embodiment of the present invention. As shown therein, every time the server 102 receives a request for delivering a new data packet, the server 102 looks-up a master scheduling table (shown in FIG. 9 and discussed below), which returns a predetermined delay. The server 102 then waits for the delay to expire before returning the requested data packet to the remote device. Referring now to FIG. 7, the boundaries between the remote device (such as devices 104-122 of FIG. 1, for example), the network 124 and the transactional server 102 are shown in dashed lines. According to the embodiment of the present invention shown in FIG. 6, a remote device whose identifier (ID) is XYZ initiates a download session to retrieve data file ABC from a server 102, at step S701. The download session sends a request for the file ABC to the server 102, together with its device ID (XYZ), as shown at S702. The server 102 receives this request, opens a download session for file ABC at S703, consults the master schedule table for device ID XYZ at S704 to determine the scheduled delay for device ID XYZ, waits for the scheduled delay at S705 after which packet #1 is retrieved at S706 and sent to the requesting remote device at S707. Packet #1 may then received and stored by the remote device at S708. The remote device may then request Packet #2 at S709, whereupon the server 102 again consults the master schedule table for device ID XYZ at S710, waits for the delay specified therein at S711, retrieves packet #2 at the end of the specified delay at S712 and sends it to the remote device at S713. The remote device may then receive and store Packet #2. Further packets may then be requested and received in a similar manner, as shown at S715, S716, S717, S718 until the last packet is retrieved and a last packet flag is set by the server 102, as shown at S719. The last Packet #n may then be sent to the remote device, together with the last packet flag, as shown at S720. The last packet #n may then be stored by the remote device at S721. The remote device may then close the download session, as shown at S722.

Figure 8:
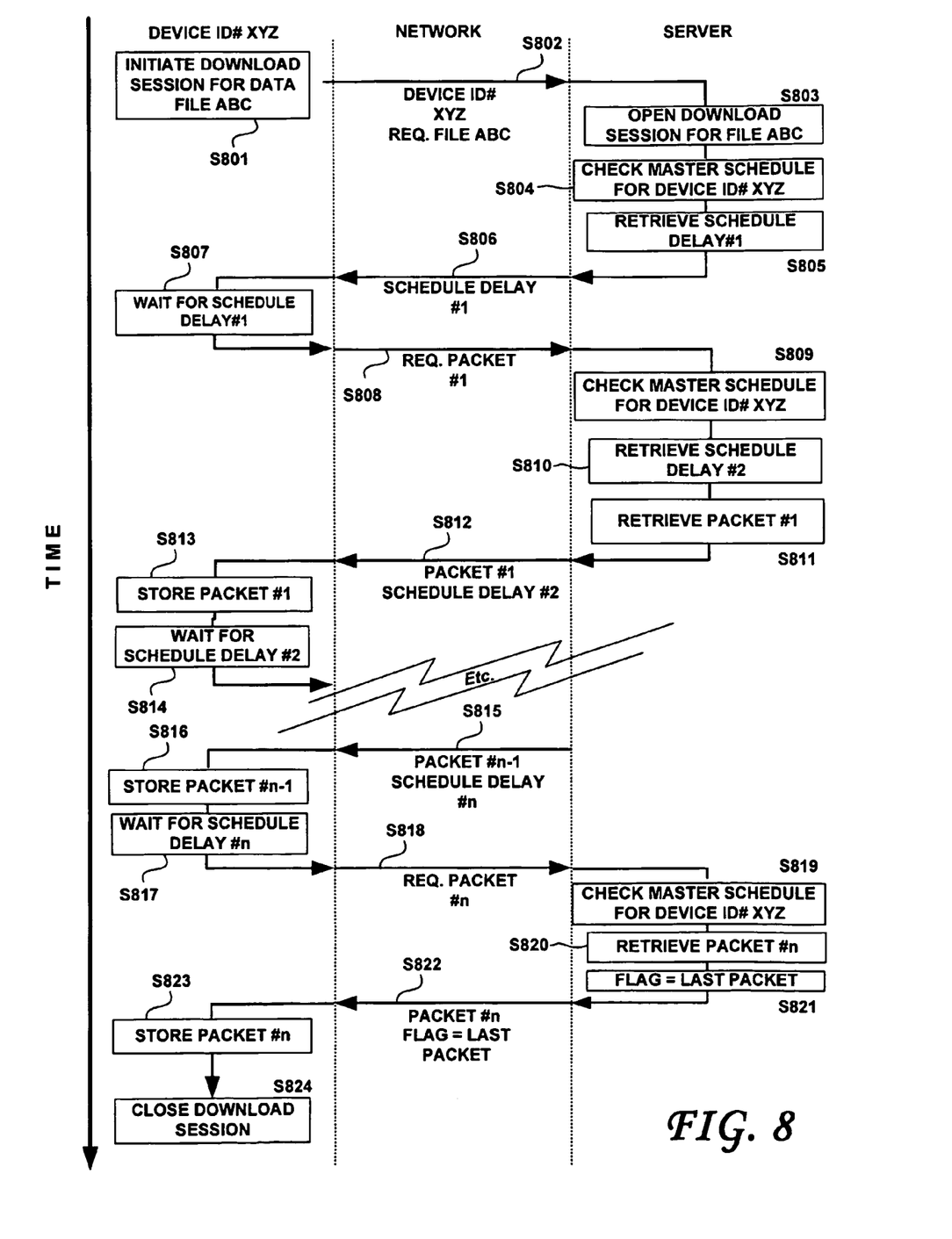
FIG. 8 is a flowchart illustrating a regulated download session in accordance with another embodiment of the present invention.

FIG. 8 is a flowchart 800 illustrating a regulated download session in accordance with another embodiment of the present invention. According to this embodiment, each time the server 102 receives a request for a new data packet from the remote device, the server 102 consults a master schedule table, and retrieves a predetermined delay therefrom. The server 102 returns the requested data packet together with the retrieved delay value to the remote device over the network 124. The remote device then waits for the delay to expire before requesting a new data packet from the server 102. Referring now to FIG. 8, the boundaries between the remote device (such as devices 104-122 of FIG. 1, for example), the network 124 and the transactional server 102 are shown in dashed lines. According to the embodiment of the present invention shown in FIG. 8, a remote device whose identifier (ID) is XYZ (for example) initiates a download session to retrieve data file ABC from a server 102, at step S801. The download session sends a request for the file ABC to the server 102, together with its device ID (XYZ), as shown at S802. The server 102 receives this request, opens a download session for file ABC at S803, and consults the master schedule table for device ID XYZ at S804 and retrieves therefrom the first scheduled delay for device ID XYZ at S805. The retrieved first delay is then sent to the remote device at S806, which remote device then waits an interval of time equal to the received delay at S807 before requesting Packet #1 from the server, as shown at S808.

The server 102 receives this request and checks the master schedule table for device XYZ as shown at S809 and retrieves therefrom the delay #2, as shown at S810. The server 102 then retrieves Packet #1 at S811 and sends it to the remote device, together with the retrieved delay #2, as shown at S812. The remote device may then receive packet #1 and the delay #2, store Packet #1 as shown at S813 and wait at S814 for the expiration of the received delay #2 before requesting the next packet of file ABC from the server 102. The same steps are then sequentially carried out by the remote device and the server 102 until the penultimate Packet #n-1 is sent by the server 102 to the remote device, together with the last scheduled delay #n retrieved by the server 102 from the master schedule table, as shown at S815. Packet #n-1 is then stored by the remote device at S816, which remote device waits for the expiration of the time period specified by the received delay #n, as shown at S817. After the delay #n, the remote device requests the last packet, packet #n from the server 102, at S818. Upon receipt of the request for packet #n, the server 102 may check the master schedule table. As packet #n is the last packet of file ABC, there is no further delay contained in the master schedule table for device ID XYZ, the packet #n is retrieved at S820 and the last packet flag is set at S821. At step S822, the last packet, packet #n is sent to the remote device, together with the last packet flag set. The remote device may then receive and store Packet #n at S823, note that the last packet flag is set and close the download session for file ABC, as shown at S824. Upon receiving confirmation that file ABC has been well received by the remote device, the server may also close the download session it opened in step S803, although this is not shown in FIG. 8.

The operation to wait for a delay to expire requires computational resources that may become significant when handling a very large number of download sessions for an equal number of remote devices. For this reason, the method illustrated in FIG. 8 in which the remote device waits for a predetermined time interval before requesting the next packet may be advantageous in some applications. Indeed, the download regulation method described above relative to FIG. 8 has the advantage of distributing the computation resources to the remote devices, thus easing scalability and relieving the server 102 from having to expend the computational resources necessary to regulate the delays on behalf of a large number of distributed remote devices.

Figure 9:
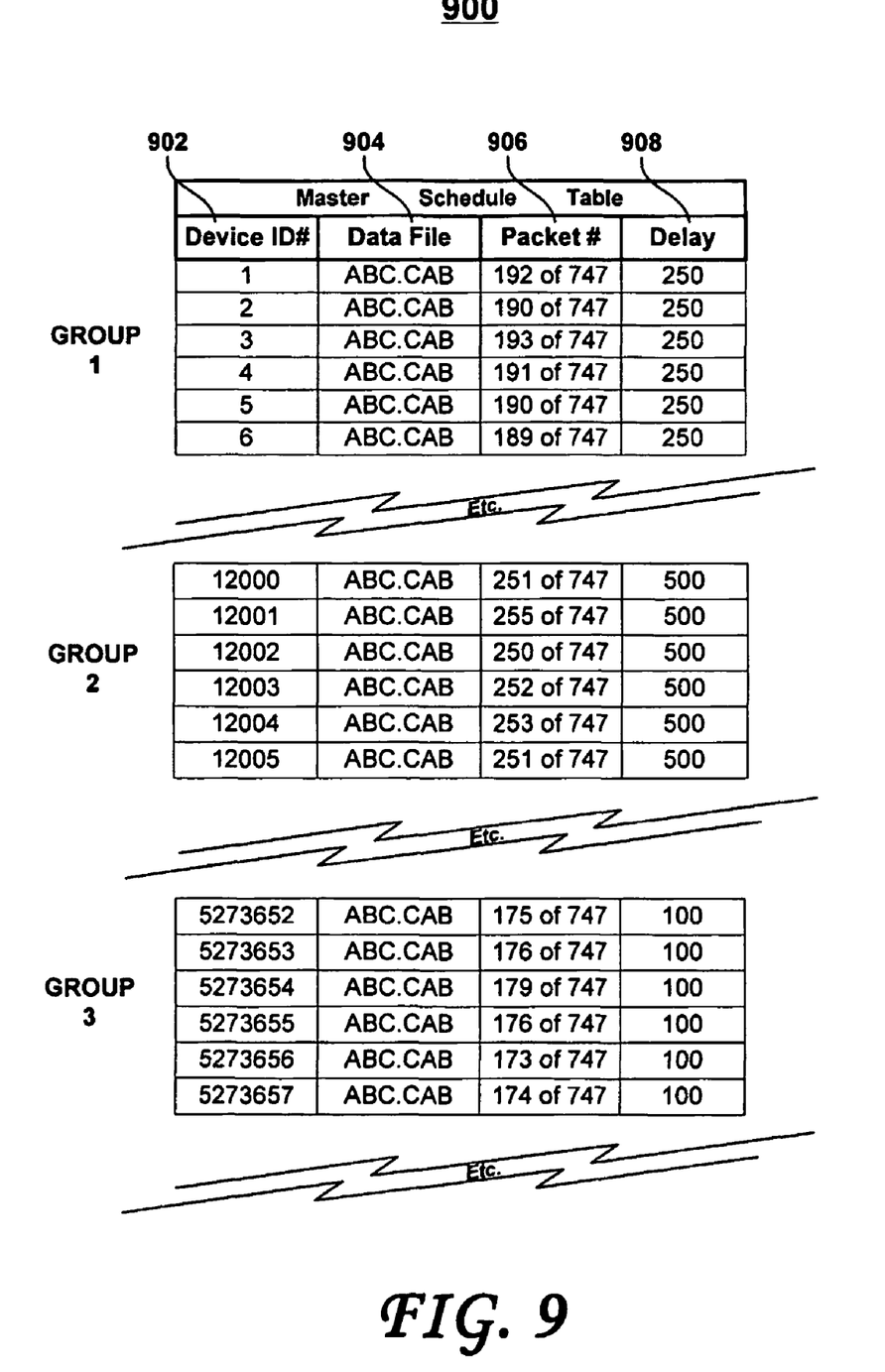
FIG. 9 is a diagram depicting a master schedule table, in accordance with an embodiment of the present invention.

FIG. 9 is a diagram depicting a master schedule table 900, in accordance with an embodiment of the present invention. The master schedule table 900 may include an entry (e.g., a row) for each of any number of remote devices (such as the remote devices shown at reference numerals 104-122 in FIG. 1). The master schedule table, according to an embodiment of the present invention, is an extension of the master transactional table that controls the operational/operational traffic (operational traffic and transactional traffic include the data exchanged between the server and the remote devices incident to the operation and use of the remote device). The fields (or attributes) for each row of the master schedule table 900 include (at a minimum) Device ID 902, Data File 904, Packet Number 906 and Delay 908. The device ID is associated with the remote device 104-122 whose attributes are given in the row. The Data File is the file that the remote device requests to download. The Packet Number is a predetermined fragment of the data file, whereby the data file comprises a predetermined number of fragments of predetermined size or sizes. The Delay is a value that represents a predetermined time delay. The time delay is set to a selected value in accordance with a desired download strategy. An example of such a download strategy for close-loop throttling is detailed below.

For ease of illustration, the master schedule table 900 is divided into three exemplary groups (e.g., Group 1, Group 2 and Group 3). Each group of the master schedule table 900 is associated with a different Delay value (such as the exemplary values of 250, 500, 100). The units of the delay column of the master schedule table 900 may be expressed in milliseconds, for example. As shown in FIG. 9, all of the remote devices are requesting the download of the (same) data file ABC.CAB, which comprises a total 747 packets. For each row of the master schedule table 900, the last packet being sent is shown. For example, Device ID# 5273654 has been sent data packets up to packet # 179.

It is to be noted that for Group 2, on the order of 250 packets have been sent, while for Group 1, on the order of 190 packets have been send. Consequently, remote devices belonging to (whose device IDs are listed in) Group 2 are ahead of remote devices in Group 1, in terms of number of packets received. Therefore, in accordance with a predetermined download strategy, devices in Group 1 may be given a higher download priority by setting the Delay value to 250 milliseconds. Given the shorter delay between requests for packets, Group 1 remote devices should soon catch up with Group 2 remote devices. In this manner, remote devices in Group 1 and 2 would have the same number of packets of file ABC.CAB downloaded. As also shown in FIG. 9, remote devices whose device IDs are grouped in Group 3 lag behind Group 1 and 2. To cause remote devices belonging to Group 3 to download packets at a faster rate, the Delay value may be adjusted downward for those remote devices by allocating thereto, for example, a relatively shorter 100 millisecond delay value. The Delay values in the master schedule table 900 may be a static value. Alternatively, the Delay value may be, as outlined above, throttled upward (longer delays) or downward (shorter delays) during a download session, depending upon most any download strategy. For example, it may be preferable to favor some remote devices over others. The favored remote devices may be associated with shorter delays than the non-favored remote devices. Alternatively, the throttling may be carried out to attempt to equalize the number of packets downloaded, across all remote devices. Alternatively still, some values in the Delay column may be fixed, while other values therein may be adjusted as needed before, during and/or after a download session. Those of skill in this art will recognize other permutations and devise other download strategies, and all such permutations and download strategies are deemed to fall within the scope of the present invention.

It is to be noted that the download regulation or throttling driven by a master schedule table 900 as described above provides identical results for both types of regulations, that is, whether the delay is performed at the server 102 (as shown at FIG. 7) or alternatively at the remote device (as shown at FIG. 8).

Figure 10:
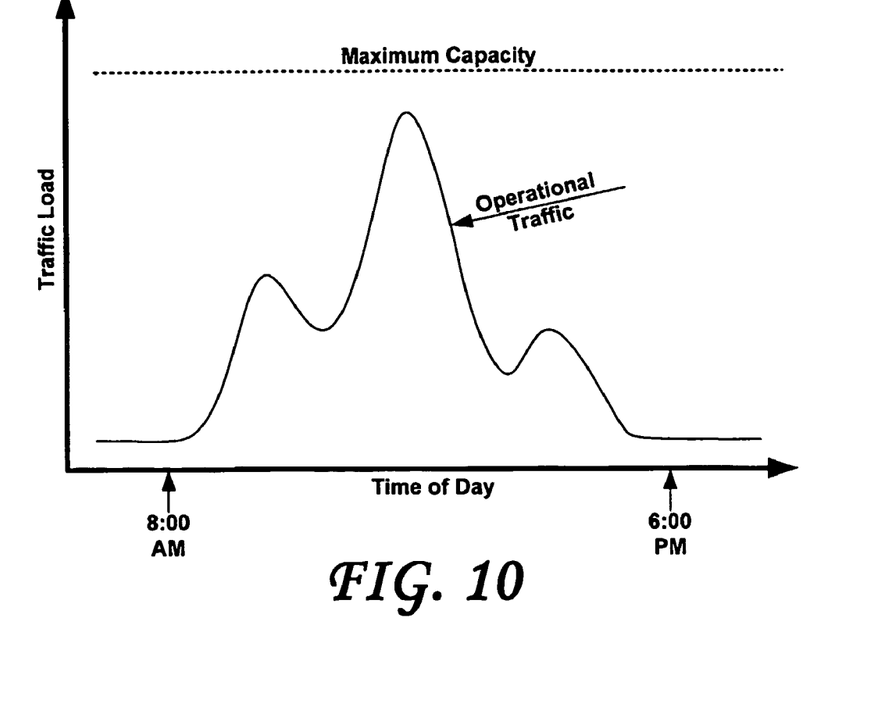
FIG. 10 is a graph showing operational traffic load over time.

FIG. 10 is a graph showing operational traffic load over time. When considering operational transactional traffic between a number of geographically distributed remote devices (104-122) and one or a plurality of transactional servers 102, (in which traffic load varies over the hours of the day as shown in FIG. 10), the maximum traffic capacity usually corresponds to the operational traffic peak load. In the illustrative case shown in FIG. 10, the peak load occurs around noon. The maximum traffic capacity as represented in dashed lines in FIG. 10 is usually a flat horizontal line and the infrastructure has been built to meet this capacity. This entails that traffic capacity is wasted when not at peak load. Depending on the contract negotiated with the communication network provider, the maximum capacity over a 24-hour period may not be a flat line.

Figure 11:
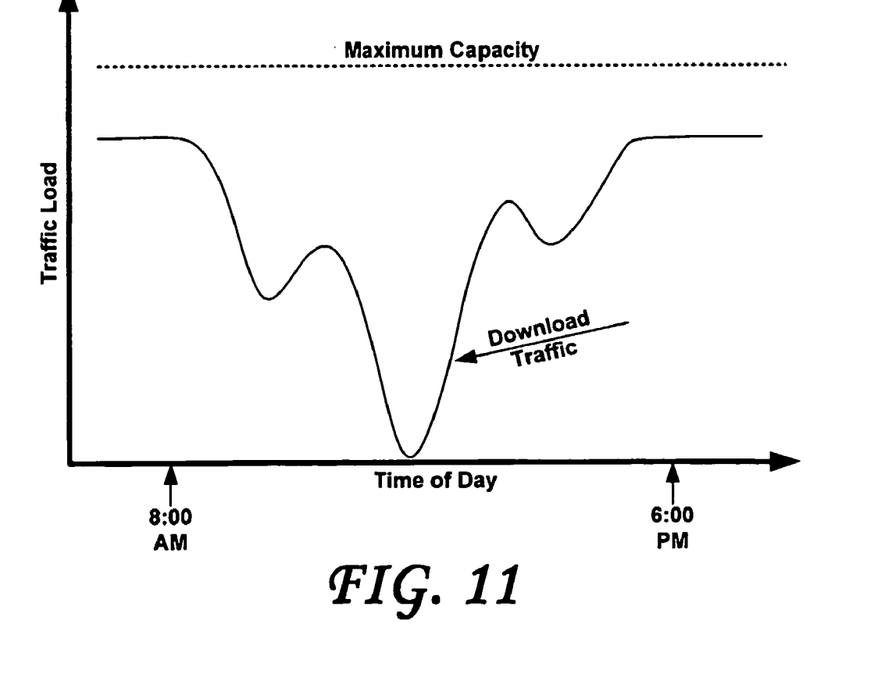
FIG. 11 is a graph showing throttled download traffic.

Such as shown at FIG. 11, other types of traffic may not be allowed during peak load operational hours in order to ensure that high priority operational traffic is not jeopardized. Downloading of files, as shown in FIG. 11, may advantageously be scheduled outside of the peak operational hours shown in FIG. 10.

Figure 12:
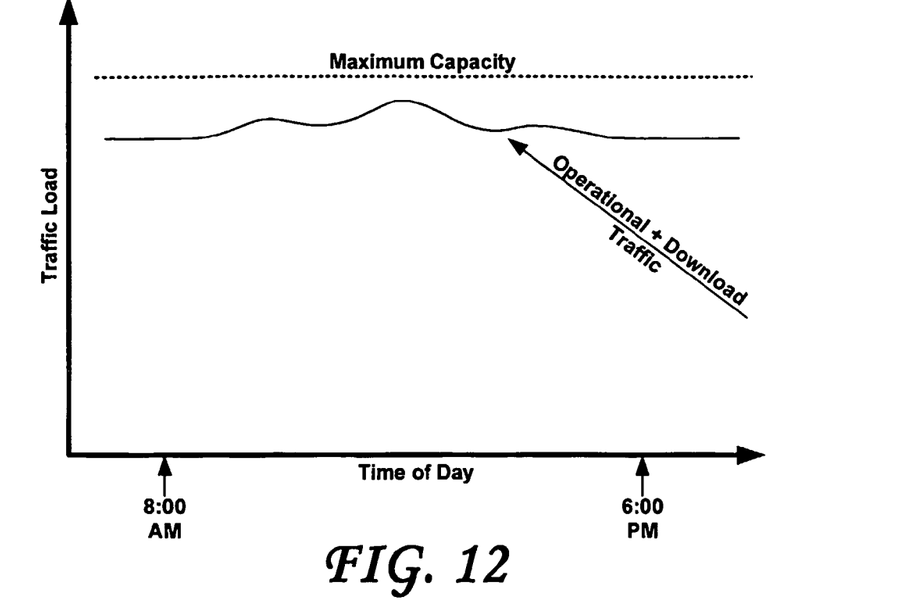
FIG. 12 is a diagram illustrated closed loop download throttling, in accordance with an embodiment of the present invention.
Figure 13:
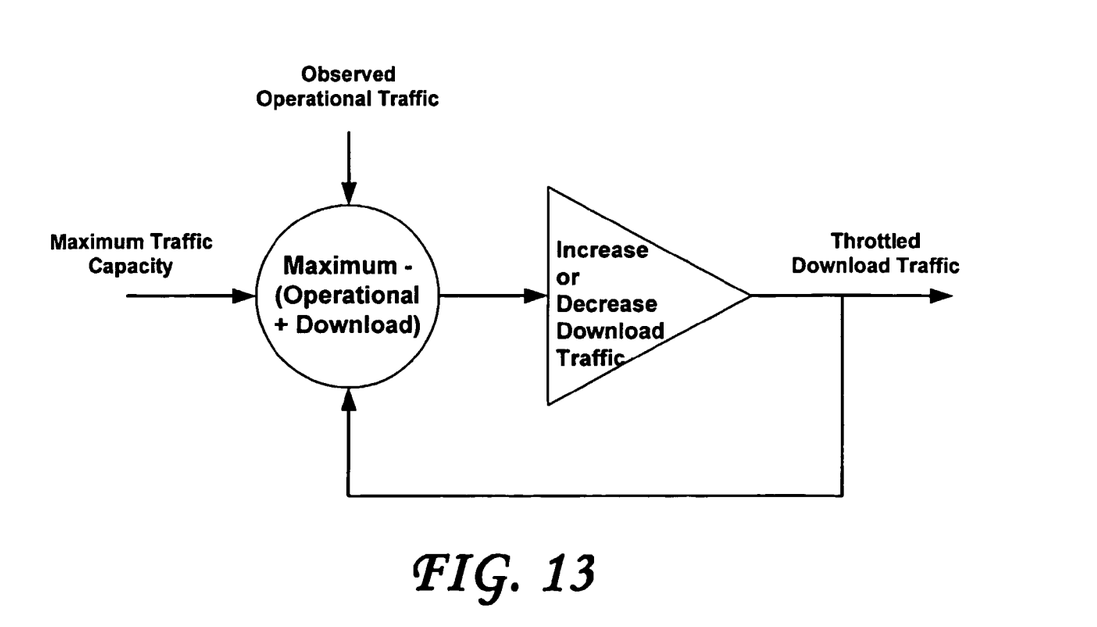
FIG. 13 is a graph illustrating throttled operational and download traffic, in accordance with an embodiment of the present invention.

The regulated data download scheme that is the subject of this invention allows throttling the download traffic as shown in FIG. 12 above in accordance with a predetermined download traffic profile or strategy, leading to an efficient use of the available bandwidth capacity.

FIG. 12 is a representation of a download traffic strategy that uses a close-loop technique such that the combined operational and download traffic always operates at or near maximum capacity as shown in FIG. 12. As shown and according to an embodiment of the present invention, the sum of the observed operational traffic and the throttled download traffic is subtracted from the maximum traffic capacity, the result of which drives the increase or decrease in download traffic (by means of, for example, adjusting the delays in the master schedule table 900) according to a desired download strategy.

The method described herein offers great benefits as it allows to significantly shorten large scale data download campaigns by enabling the regulation of downloads across many remote devices to maintain the aggregate download traffic close to the maximum network designed-in capacity, without running the risk of creating the dreaded DDOS effect. As the data present download method may advantageously utilize transactional tunnel service offered by a large scale disaster tolerant transactional server (such as disclosed, for example, in the commonly assigned and co-pending US patent applications referred to above), it is secure, highly scalable, extremely robust and applicable to millions of remote devices.

What is claimed is:

1. A method for sending a file from a server to a remote device over a network, comprising:
   dividing at the server the file into a plurality of packets;
   a first sending step to send from the server a packet of the plurality of packets of the file to the remote device along with a selected delay value, the selected delay value specifying a period of time that the remote device must wait before requesting another packet of the plurality of packets from the server, the delay value being selected as a function of at least the capacity of file network and an observed transactional or operational traffic between the server and the remote device;
   receiving at the server after a period of time at least equal to the delay value, a request for another packet of the plurality of packets from the remote device;
   only upon receipt of the request from the remote device, returning by the server to first sending step until a request for a last packet of the plurality of packets is received from the remote device, and
   a second sending step to send from the server the last packet of the plurality of packets of the file to the remote device.

2. The method of claim 1, wherein the selected delay value is maintained constant during the first and second sending steps.

3. The method of claim 1, wherein the selected delay value is dynamic, and wherein the server further carries out a step of varying the selected delay value.

4. The method of claim 1, wherein the selected delay value is stored in a master schedule table and wherein the first sending step includes a step of selecting the delay value from the master schedule table.

5. The method of claim 1, wherein the server is adapted to change the selected delay value to change a rate at which the plurality of packets are sent to the remote device.

6. The method of claim 1, further including the step of increasing or decreasing the delay value sent to the remote device as a function of at least one of a maximum capacity of a communication channel between the server and the remote device, an observed operational traffic between the remote device and the server and a rate at which the server is sending successive packets of the plurality of packets to the remote device.

7. The method of claim 1, further including a step of receiving a request for the file from the remote device, the request including an identification of the file and a device ID unique to the remote device.

8. The method of claim 7, further including a step of retrieving the delay value from a master schedule table stored by the server, the delay value sent during the first sending step being associated in the master schedule table with the device ID received from the remote device.

9. The method of claim 7, further including the step of tracking a progress of the first and second steps by storing an identification of a latest packet sent to the remote device in the master schedule table.

10. The method of claim 1, further including establishing a transactional tunnel between the server and the remote device and wherein the first and second sending steps send the plurality of packets through the transactional tunnel.

11. The method of claim 1, wherein the file is at least a portion of a game and wherein the plurality of remote devices includes a gaming machine.

12. The method of claim 1, wherein the file includes multimedia content and wherein the plurality of remote devices includes a multimedia kiosk.

13. The method of claim 1, wherein the file includes multimedia content and wherein the plurality of remote devices includes a set top box for a television.

14. The method of claim 1, wherein the delay value is selected by evaluating a close-loop download regulation algorithm that is configured to achieve a highest download capacity for the file without exceeding the maximum network capacity and without degrading the transactional and operational traffic performance between the server and the remote device.

15. The method of claim 1, further including a step of grouping the plurality of remote devices into a plurality of groups and wherein the selected delay value is selectable for each group.

16. The method of claim 1, wherein the delay is selected to be as short as possible without exceeding the maximum network capacity or without degrading the transactional or operational traffic performance between the server and the remote device.

17. The method of claim 1, whereby the sending step includes at least one of a step of encrypting and signing the predetermined number of file fragments.

18. A method for sending a file from a server to a plurality of remote devices over a network, comprising:
   dividing at the server the file into a plurality of packets, and
   sending from the server constituent packets of the plurality of packets of the file to each of the plurality of remote devices at a rate that is controlled by a selected delay value that is configurable for each of the plurality of packets and for each of file plurality of remote devices, the selected delay being effective to cause the plurality of remote devices to wait for an expiry of the selected delay value before requesting a release of a next packet of the plurality of packets from the server, the delay value being selected as a function of at least the capacity of the network and an observed transactional or operational traffic between the server and the remote devices, wherein each of the plurality of remote devices are configured to receive a next packet of the plurality of packets of the file only after having requested the next packet of the plurality of packets of the file from the server at the expiry of the selected delay.

19. The method of claim 18, wherein the selected delay value for each of the plurality of remote devices is stored in a master schedule table and wherein the sending step includes a step of selecting the delay value from the master schedule table.

20. The method of claim 18, further including the step of increasing or decreasing the selected delay value as a function of at least one of a maximum capacity of a communication channel between the server and the remote devices, an observed operational traffic between the remote devices and the server and the rate at which the server is sending successive packets of the plurality of packets to the remote devices.

21. The method of claim 18, further including a step of the server receiving a request for the file from each of the plurality of remote device, the requests including an identification of the file and a device ID that is associated with and unique to the requesting remote device.

22. The method of claim 21, further including a step of retrieving the delay value from a master schedule table stored by the server, the selected delay value being associated in the master schedule table with the received device ID.

23. The method of claim 21, further including the step of tracking a progress of the sending step by storing an identification of a latest packet sent to each of the plurality of remote devices in the master schedule table.

24. The method of claim 23, further comprising a step of changing the selected delay value associated with selected ones of the plurality of remote devices based upon the identification of the latest packet sent to the selected ones of the plurality of remote devices.

25. The method of claim 18, further including a step of grouping the plurality of remote devices into a plurality of groups and wherein the rate at which the constituent packets of the plurality of packets are sent to the remote devices is selectable for each group.

26. The method of claim 18, further including a step of the server initiating the sending of the file to the plurality of remote devices, wherein the initiating server requests a device ID from each of the plurality of remote devices.

27. The method of claim 26, further including a step of retrieving the delay value from a master schedule table stored by the server, the selected delay value for each of the plurality of remote devices being associated in the master schedule table with the requested device ID received from each of the plurality of remote devices.

28. The method of claim 18, further including establishing a transactional tunnel between the server and each of the plurality of remote devices and wherein the sending step sends the plurality of packets through the transactional tunnel.

29. The method of claim 18, wherein the file is at least a portion of a game and wherein the plurality of remote devices includes a gaming machine.

30. The method of claim 18, wherein the file includes multimedia content and wherein the plurality of remote devices includes a multimedia kiosk.

31. The method of claim 18, wherein the file includes multimedia content and wherein the plurality of remote devices includes a set top box for a television.

32. The method of claim 18, wherein the delay value is selected by evaluating a close-loop download regulation algorithm that is configured to achieve a highest download capacity for the file without exceeding the maximum network capacity and without degrading the transactional and operational traffic performance between the server and the remote device.

33. The method of claim 18, wherein the delay is selected to be as short as possible without exceeding the maximum network capacity and without degrading the transactional and operational traffic performance between the server and the remote device.

34. The method of claim 18, whereby the sending step includes at least one of a step of encrypting and signing the predetermined number of file fragments.

35. A method for controlling the download of a file on a network from a server to a plurality of remote devices simultaneously with a higher priority operational traffic, comprising:
    observing at the server the operational traffic and determining an available bandwidth on the network as a function at least of the observed operational traffic;
    computing at the server a delay value for each of or for a selection of the plurality of remote devices as a function at least of the determined available bandwidth;
    sending from the server the computed delay along with a first fragment of the file to be downloaded to each of the selection of the plurality of remote devices;
    causing the plurality of remote devices to send a request to the server for a next file fragment of the file at an expiry of the computed delay value, and
    sending the next file fragment from the server to each of the plurality of remote devices only upon receiving a corresponding request for the next file fragment sent by each of the plurality of remote devices.

36. The method of claim 35, further including a step of recording the computed delay values in a master schedule.

37. The method of claim 36, further including retrieving the recorded delay values are retrieved from the master schedule prior to the sending step.

38. The method of claim 35, whereby the sending step includes at least one of a step of encrypting and signing the predetermined number of file fragments.

* * * * *

UNITED STATES PATENT AND TRADEMARK OFFICE
CERTIFICATE OF CORRECTION

PATENT NO.        : 7,542,487 B2
APPLICATION NO.   : 10/493651
DATED             : June 2, 2009
INVENTOR(S)       : Jean-Marie Gatto and Thierry Brunet de Courssou It is certified that error appears in the above-identified patent and that said Letters Patent is hereby corrected as shown below:

Col. 11, lines 7-28; should read;

1. A method for sending a file from a server to a remote device over a network, comprising:
    dividing at the server the file into a plurality of packets;
    a first sending step to send from the server a packet of the plurality of packets of the file to the remote device along with a selected delay value, the selected delay value specifying a period of time that the remote device must wait before requesting another packet of the plurality of packets from the server, the delay value being selected as a function of at least the capacity of the network and an observed transactional or operational traffic between the server and the remote device;
    receiving at the server after a period of time at least equal to the delay value, a request for another packet of the plurality of packets from the remote device;
    only upon receipt of the request from the remote device, returning by the server to first sending step until a request for a last packet of the plurality of packets is received from the remote device, and
    a second sending step to send from the server the last packet of the plurality of packets of the file to the remote device.

Col. 12, lines 29-48; should read;

18. A method for sending a file from a server to a plurality of remote devices over a network, comprising:
    dividing at the server the file into a plurality of packets, and
    sending from the server constituent packets of the plurality of packets of the file to each of the plurality of remote devices at a rate that is controlled by a selected delay value that is configurable for each of the plurality of packets and for each of the plurality of remote devices, the selected delay being effective to cause the plurality of remote devices to wait for an expiry of the selected delay value before requesting a release of a next packet of the plurality of packets from the server, the delay value being selected as a function of at least the capacity of the network and an observed

UNITED STATES PATENT AND TRADEMARK OFFICE
CERTIFICATE OF CORRECTION

PATENT NO. : 7,542,487 B2
APPLICATION NO. : 10/493651
DATED : June 2, 2009
INVENTOR(S) : Jean-Marie Gatto and Thierry Brunet de Courssou It is certified that error appears in the above-identified patent and that said Letters Patent is hereby corrected as shown below:

transactional or operational traffic between the server and the remote devices, wherein each of the plurality of remote devices are configured to receive a next packet of the plurality of packets of the file only after having requested the next packet of the plurality of packets of the file from the server at the expiry of the selected delay.

Signed and Sealed this

Twenty-fifth Day of August, 2009

David J. Kappos
*Director of the United States Patent and Trademark Office*